Feb. 13, 1951 F. H. COLE 2,541,207
TIMER FOR ELECTRIC HEATING APPLIANCES
Filed Sept. 28, 1946 4 Sheets-Sheet 1

INVENTOR
FRED H. COLE
BY
Mellin & Hanscom
ATTORNEYS

Feb. 13, 1951 F. H. COLE 2,541,207
TIMER FOR ELECTRIC HEATING APPLIANCES
Filed Sept. 28, 1946 4 Sheets-Sheet 2

INVENTOR
FRED H. COLE
BY
Mellin + Hanscom
ATTORNEYS

Feb. 13, 1951 F. H. COLE 2,541,207
TIMER FOR ELECTRIC HEATING APPLIANCES
Filed Sept. 28, 1946 4 Sheets-Sheet 3

INVENTOR
FRED H. COLE
BY
Mellin & Hanscom
ATTORNEYS

Feb. 13, 1951     F. H. COLE     2,541,207
TIMER FOR ELECTRIC HEATING APPLIANCES

Filed Sept. 28, 1946     4 Sheets-Sheet 4

INVENTOR
FRED H. COLE
BY
Mellin & Hanscom
ATTORNEYS

Patented Feb. 13, 1951

2,541,207

UNITED STATES PATENT OFFICE 2,541,207

TIMER FOR ELECTRIC HEATING APPLIANCES

Fred H. Cole, Los Angeles, Calif.

Application September 28, 1946, Serial No. 700,145

9 Claims. (Cl. 175—320)

This invention relates to electric heating appliances, and more particularly to timing devices for determining the period of current application to the heating elements of toasters and similar appliances.

Variations or changes in line voltage impose corresponding alterations in the rate of heat input to an electric toaster and results in lack of uniformity in the toaster products. A decrease in voltage from the normal value diminishes the heat applied to the toaster during a fixed period of current application and, conversely, an increase in voltage from such normal value increases the applied heat. In either event, the bread or other product is improperly toasted. In addition, changes in the temperature of the ambient air adversely affect uniform toasting of the products unless the extent of heat application is changed correspondingly.

It is, accordingly, an object of the present invention to provide an improved timer for a heating appliance, such as an electric toaster, which can vary the period of heat application automatically in accordance with variations or changes in line voltage, thereby insuring the application of the required, predetermined quantity of heat energy to the appliance.

Another object of the invention is to provide an improved timer capable of automatically modifying the time of current application to a heating appliance in accordance with variations in the temperature of the ambient air.

A further object of the invention is to provide a timer for a heating appliance which is relatively simple to manufacture and assemble, possessing fewer parts which do not require close tolerances or great accuracy in order to obtain close control of the timing cycle.

In its general aspects, the invention contemplates a timer for an automatic electric toaster, or other time controlled heating appliance, which operates in dependence upon the heating and cooling of a thermal responsive timer element. Heat is applied to the element simultaneously with its application to the appliance to cause movement of the element in one direction to a predetermined position. The time required for the heat applied to the element to produce its movement to such position is dependent upon the line voltage; greater voltages requiring lesser time, and smaller voltages, greater time. Upon reaching this predetermined position, heating of the timer element ceases automatically, whereupon it begins to cool, returning towards its initial position, which, when reached, effects discontinuance of current application to the appliance. The time consumed by the element during its return cooling movement may be varied by a compensating device capable of altering its starting or initial position in accordance with the temperature of the ambient air.

Current is passed through the heating elements of the appliance during both the forward heating and return cooling movements of the timer element. The period of current application to the appliance is the sum of the time required for the timer element to move to its predetermined position during the heating portion of the timer cycle and the time required for its return movement during the cooling portion of the timer cycle. The time required for the first movement is varied automatically in accordance with changes in line voltage. This voltage also affects the rate of heat application of the appliance. The time required for the second movement is varied in accordance with changes in the ambient air temperature which has an effect upon the quantity of heat which should be supplied to the appliance in order that it may perform its toasting or similar heating function to the extent desired. Compensation is therefore provided for both the effects of variations in line voltage and ambient air temperatures to insure the subjection of the appliance to the proper amount of heat.

One form which the invention may assume is exemplified in the following description and illustrated by way of example in the accompanying drawings, in which.

Figure 1:
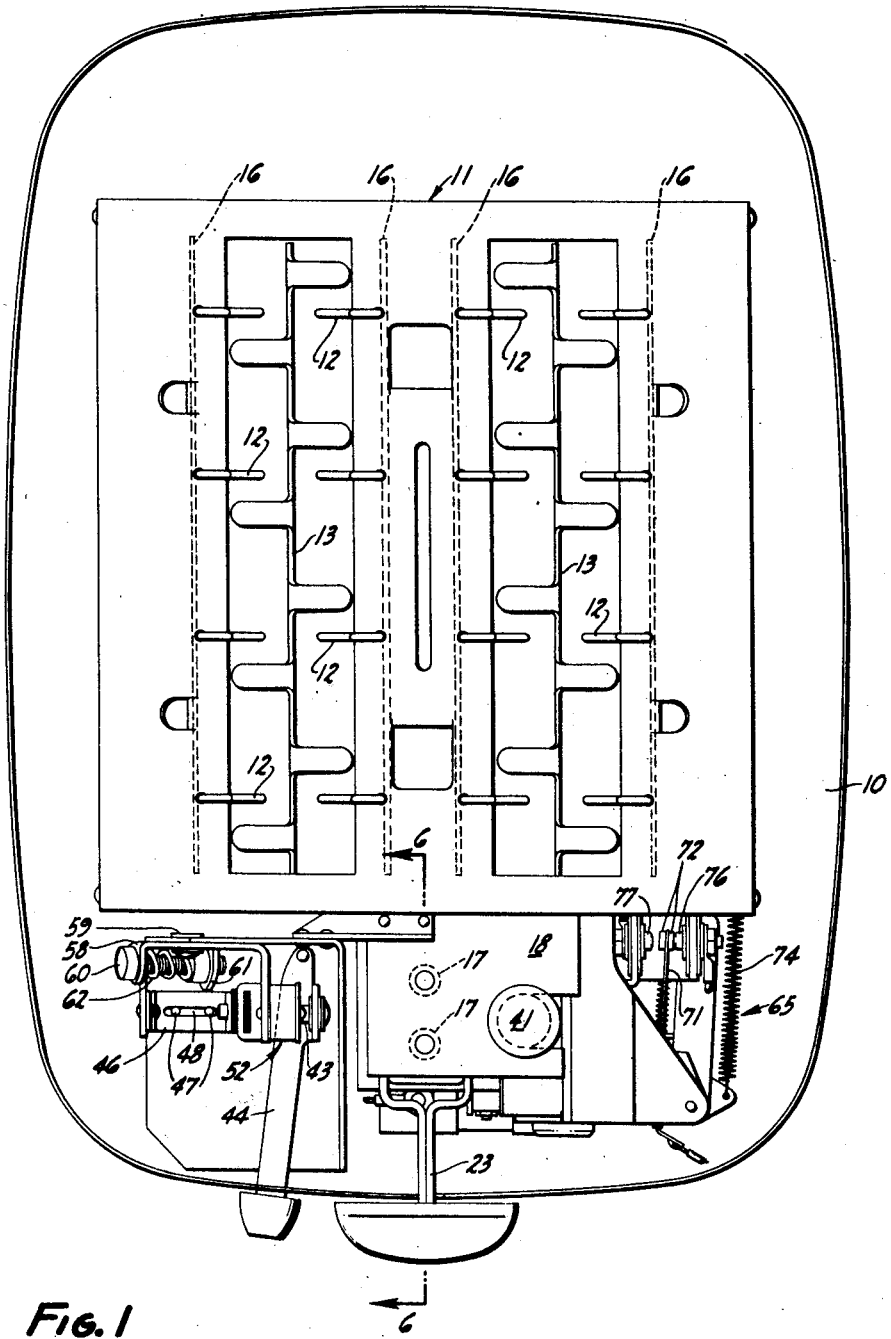
Figure 1 is a top plan view of an automatic electric toaster, with the upper outer cover removed to disclose the control mechanism.

The toaster disclosed in the drawing includes a base 10 on which an inner housing 11 is mounted for enclosing certain elements of the toaster mechanism. This housing has a plurality of bread spacers 12 secured to it on opposite sides of the arms or racks 13 of a toaster carriage 14 extending through the front wall 15 of the housing. The toaster carriage and arms are movable vertically to place the toast within the housing 11 in a position subject to the application of heat from the current carrying grids or heating elements 16, suitably mounted in the housing. The carriage 14 extends outwardly through the front wall 15, being guided for vertical movement along a pair of spaced guide rails 17 secured to upper and lower brackets 18, 19 attached to the wall 15. Upper and lower anti-friction guide rollers 20, 21 may be rotatably mounted on the carriage 14 for rolling engagement with the rails 17 to facilitate movement of the carriage.

The carriage 14 is urged in an upward direction by a suitable retractor or lifting spring 22 attached to the upper bracket 18 and carriage. The carriage 14, with its extending toaster racks 13, is movable downwardly against the action of the retractor spring 22 by a suitable handle 23 swingable on a pivot 24, secured to the carriage, between upper and lower limits determined by a pin 25 on the carriage fitting within a slot 26 in the handle. Upward movement of the handle 23 on its pivot 24 is limited by engagement of the lower end of the handle slot 26 with the pin 25, movement of the handle in the other or downward direction being limited by engagement of the other end of the slot 26 with the cooperable pin 25.

A carriage retaining latch 27 is pivotally mounted on a bracket or guide plate 28 secured to the carriage, being fastened to the handle pivot 24 and to a pin 29 which serves as the pivot or fulcrum for the main latch 27. The latch 27 has a forwardly projecting head 30 adapted to engage a stop 31 extending transversely from the handle. The latch is also provided with a transversely extending upper finger 32, to which a spring 33 is secured, whose other end is attached to the bracket 28. This spring tends to move the upper end of the latch 27 in a forward direction, to place its head 30 against the latch stop 31, and a lower latch nose 34 in a rearward direction.

When the handle 23 is depressed to lower the toaster racks 13 and the bread positioned thereon within the toaster housing 11, the carriage 14 is moved downwardly against the force exerted by the lifting spring 22 until the latch nose 34 engages a cooperable roller 35 mounted on a main switch arm 36 swingable about a pivot 37 secured to a bracket 38 attached to the base 10 of the apparatus. This nose 34 swings slightly in an outward direction against the tension of the spring 33 until it is positioned below the roller 35, whereupon the spring 33 pivots it inwardly under the roller 35. Release of the handle 23 then causes the latch nose 34 to engage the roller 35 and allows the lifting spring 22 to elevate the carriage 14 slightly and the main switch arm 36 with it, by virtue of the interconnection afforded by engagement of the latch nose with the lower portion of the switch arm roller 35. This elevating movement raises the switch arm 36 against the action of its retractor spring 37, which is secured to the arm and to the switch bracket 38, to elevate the spaced main switch contacts 39 into engagement with a pair of spaced stationary contacts 40 and close a primary electric circuit to the grid or toasting elements 16 of the toaster.

Current application to the toasting elements 16 is continued until the latch 27 is released from the roller 35 of the main switch arm 36, permitting the spring 37 to move the switch arm downwardly and open the switch contacts 39, 40. Release of the latch 27 from the main switch arm also allows the lifting spring 22 to raise the carriage 14, its arms 13 and the toasted bread to a delivery position, in order that the latter may be removed from the toaster. Such elevating movement may be retarded by a suitable dashpot arrangement, including a cylinder 41 carried by the upper bracket 18 and a dashpot rod 42 suitably secured to the main carriage 14.

The time of heat application is governed automatically by a thermal timer device, which controls the release of the latch nose 34 from engagement with the latch roller 35 of the main switch arm 36. This automatic timer includes a relatively fixed contact 43 mounted on a selector arm 44 extending through the outer cover of the toaster, and pivotally mounted on the toaster base 10. A second contact 45 is mounted on a movable bracket 46, guided by a pair of spaced pins 47 extending upwardly from the base through a bracket slot 48. A bimetallic compensating strip 49 is secured to the movable bracket 46 and is fixed above the bracket to another bracket 50 attached to the front wall 15 of the housing.

A movable contact 51 is positioned between the spaced, relatively stationary contacts 43, 45, being secured to a timer bow 52 consisting of two spaced apart strips 53, 54 of dissimilar metals whose lower ends are attached together by a bolt 55 extending through suitable insulating spacer blocks 56. The upper ends of the strips 53, 54 are secured to a spacer block 57 mounted on a bracket 58 swingable on a pivot pin 59 secured to the front wall 15. This bracket may be adjusted by an adjusting screw 60 extending therethrough and into a fixed bracket 61 attached to the wall 15, there being an intermediate spring 62 between the fixed bracket 61 and the movable bracket 58, tending to move the latter in one direction.

A heating strip 63 is mounted lengthwise and adjacent the time bow 52, and has a heating element 64 through which current may pass during operation of the apparatus. Normally, during the time that the heating element 64 does not have current passing through it and with the timer bow 52 comparatively cold, the latter positions its contact 51 against the compensating contact 45. However, the application of current to the heating element 64 causes the timer bow 52 to heat and deflect away from the compensating contact 45, shifting its contact 51 toward the selector contact 43 and eventually engaging it. Such engagement operates a relay 65 which functions to discontinue the application of heat to the heater element 64, which then allows the timer bow 52 to cool and return its contact 51 to its initial position in engagement with the compensating contact 45.

The relay 65 includes a solenoid coil 66 suitably mounted on the toaster bracket, enclosing a spring return plunger 67 adapted to move outwardly against a latch lever 68 pivoted to a clapper or contact support 69 pivotally mounted on the bracket 19. The lever 68 is urged toward the solenoid plunger by a suitable latch spring 70 attached to the lever and the clapper 69.

The clapper 69 carries a spring-like contact arm 71 having upper and lower contacts 72, 73 thereon. A spring 74 is attached to the housing wall 15 and to the clapper, urging the clapper 69, its contact arm 71 and contacts 72, 73 to a position in which the latter are out of contact with a fixed lower contact 75 connected to the heating element and a fixed upper contact 76 electrically connected to the selector contact 43. The contacts are removable from such engaged position into a position in which the lower contact 73 is ineffective and the upper contact 72 alone engages another fixed contact 77 in series with the compensating contact 45.

The clapper 69 and its supported arm 71 are initially retained to the left of the apparatus, as seen in Figure 1, against the action of the clapper spring 74, and with the movable contacts 72, 73 in engagement with the heating element contact 75 and the left selector contact 76, by engagement of a detent 78 on the inward end of the latch 68 with a fixed holding plate 79 positioned adjacent the solenoid 66, 67. The outer end of the latch lever 68 projects through this plate and forms a trip finger 80 for releasing the main latch 27, as explained hereinafter.

The clapper 69, its contacts 72, 73 and latch lever 68 are placed in an operative position through a suitable operating mechanism actuated by the carriage or support 14. This operating mechanism consists of a relay setting lever 81 pivotally mounted on a pin 82 secured to the front wall 15 of the apparatus and having a depending arm 83 engageable with the inner end of the clapper 69. This relay setting lever also has a pair of oppositely inclined surfaces 84, 85 engageable by a setting finger 86 fixed to and projecting outwardly from the carriage 14. Downward movement of the carriage carries the setting finger 86 with it into slidable engagement along the upper inclined surface 84 of the setting lever, swinging the latter into engagement with the clapper 69 and moving it, together with its attached latch 68, to a position in which the clapper contacts 72, 73 are in engagement with the upper selector contact 76 and the lower heater circuit contact 75. The latch spring 70 swings the latch lever 68 inwardly to a position in which its detent 78 engages the inner face of the detent holding plate 79, to maintain the contacts in the position just described against the force of the clapper spring 74.

The setting finger actuator 86 is so arranged with respect to the setting lever 81 as to ride past the upper inclined surface 84 to a position below its lower inclined surface 85, moving the latch detent 78 beyond the latch holding plate 80 to a slight extent, and then allowing the clapper spring 74 to return the clapper slightly to engage the detent firmly against the holding plate. The contact arm 71 has spring-like characteristics, and maintains its contacts 72, 73 against the selector and heater element contacts 76, 75, despite slight movement of the clapper lever 69.

Figure 8:
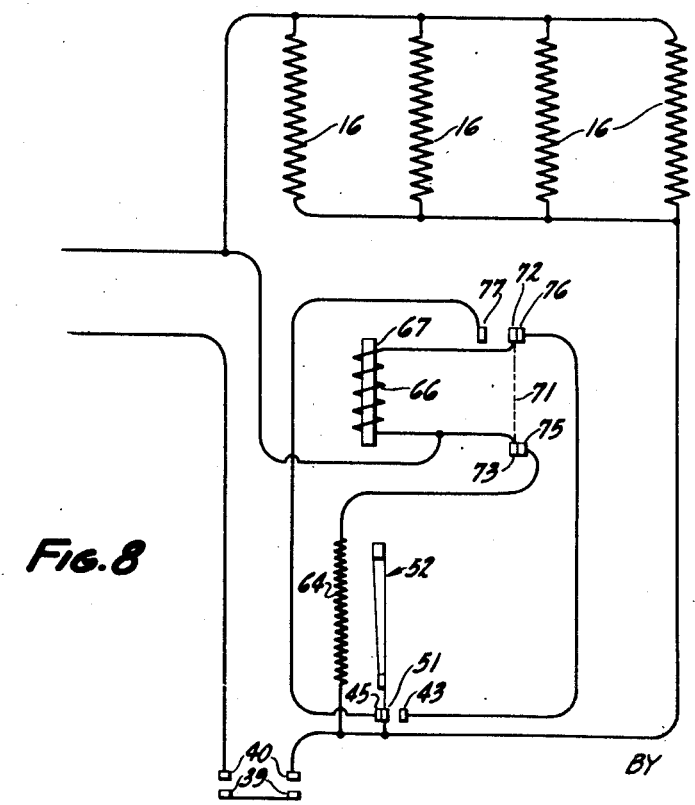
Figure 8 is a wiring diagram for the electric toaster.

It is to be noted from an inspection of the wiring diagram in Figure 8 that the primary switch 39, 40 is in series with the toasting elements or grids 16, and that the heating element 64 for the timer bow 52 is in series with the primary switch and with the lower relay contact 73 and heater circuit contact 75, when the latter are engaged. The relatively fixed selector contact 43 to the right of the timer bow is in series with the main switch 39, 40 and the solenoid coil 66 when the upper clapper contact 72 is in engagement with the upper selector contact 76, and when the timer bow 52 has moved its contact 51 into engagement with the relatively stationary selector contact 43 at the right of the apparatus. The solenoid 66 is also connected in series with the main switch and the timer bow contact 51 when the latter engages the compensating contact 45 to its left, and when the upper clapper contact 72 engages the upper compensator contact 77 at the left portion of the relay, as viewed from Figures 1 and 2.

In the operation of the toaster, let it be assumed that the carriage 14 is in its uppermost position, with the main switch 39, 40 held open by the spring 37. The bread or other product to be toasted is placed on the toaster arms 13 and the handle 23 is depressed against the lifting spring 22, which action carries the carriage and the bread to a lower position, as determined by engagement of the latch nose 34 under the latch roller 35. Release of the handle 23 then allows the lifting spring 22 to elevate the carriage 14 slightly and move the latch 27 and the main switch arm 36 upwardly to a slight extent to elevate the movable main switch contact 39 into engagement with the spaced stationary switch contacts 40, thereby closing the electric circuit to the toasting elements 16.

Figure 2:
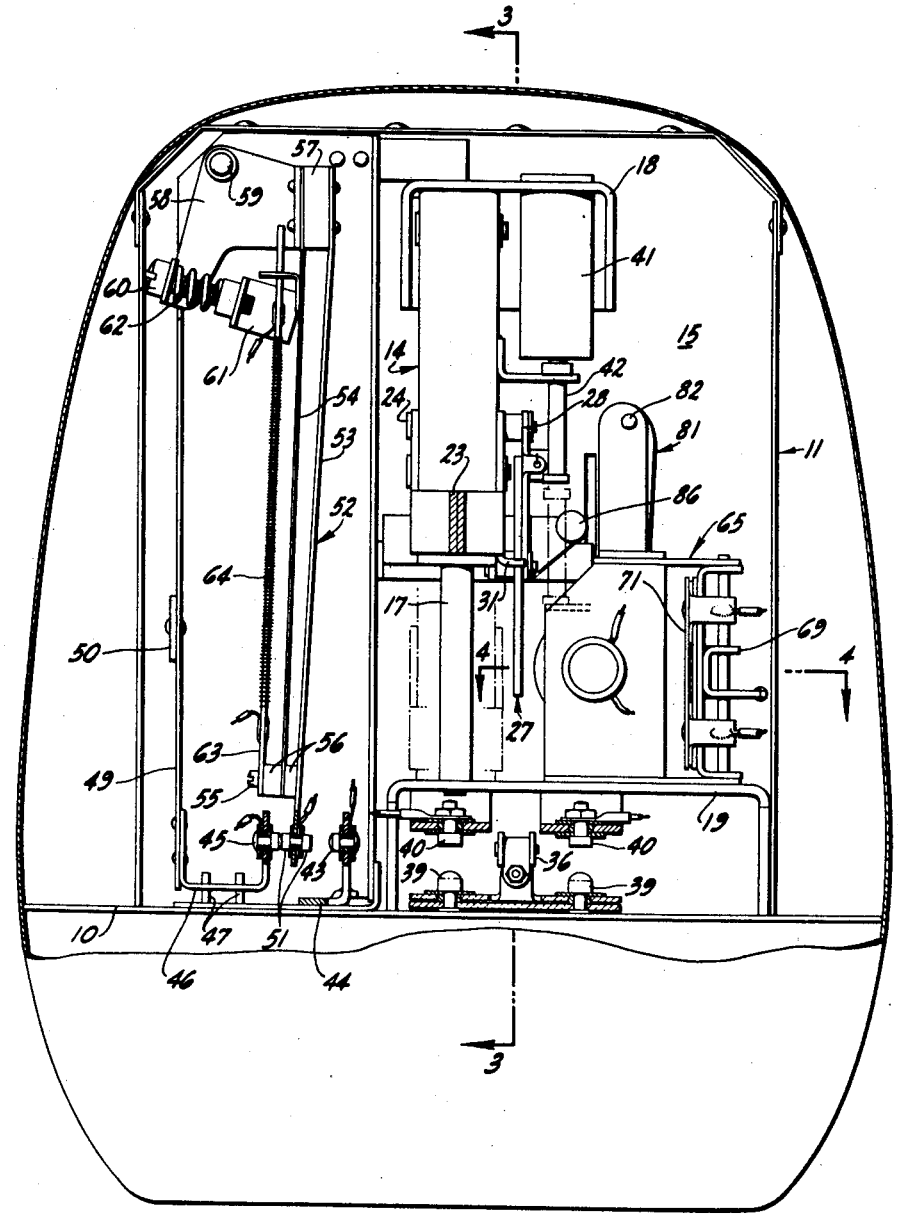
Figure 2 is a front elevation of the toaster apparatus, with the front outer cover portion removed.
Figure 3:
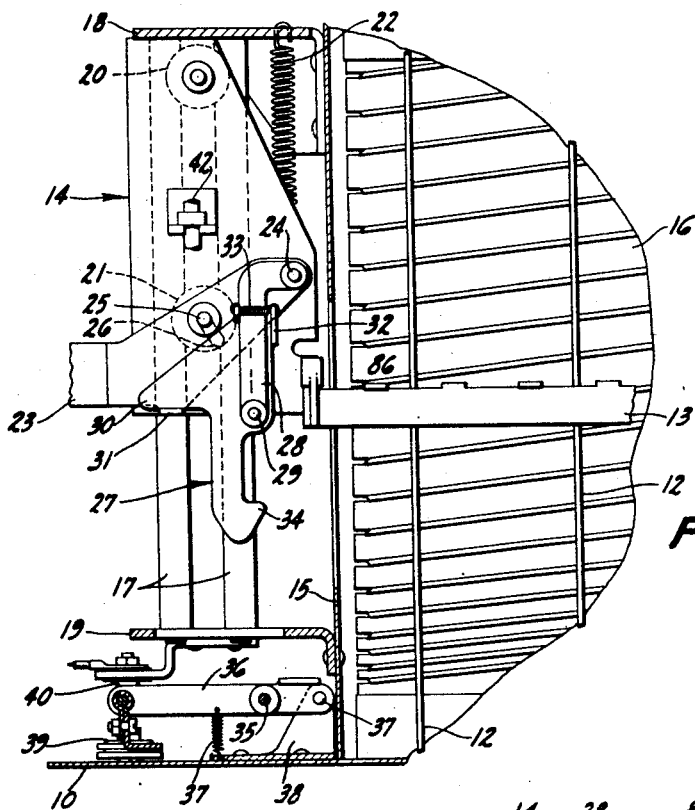
Figure 3 is a section taken generally along the line 3—3 on Figure 2.
Figure 4:
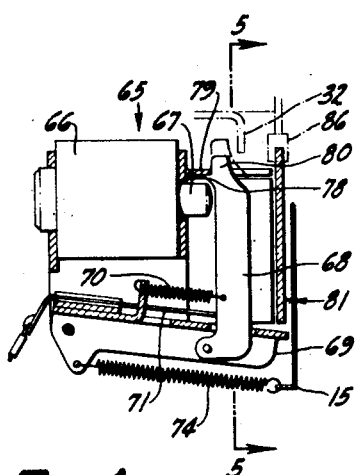
Figure 4 is a section taken along the line 4—4 on Figure 2.
Figure 5:
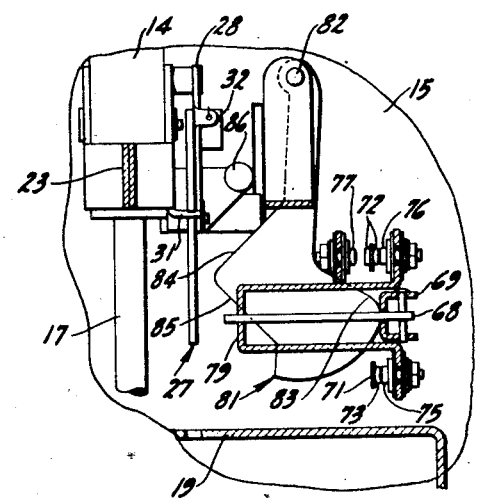
Figure 5 is a section taken along the line 5—5 on Figure 4.
Figure 6:
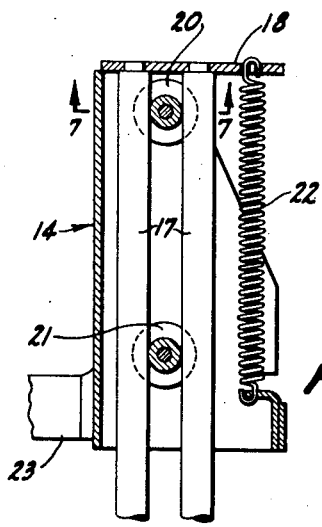
Figure 6 is a section taken along the line 6—6 on Figure 1.
Figure 7:
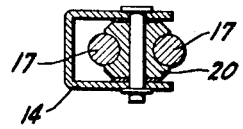
Figure 7 is a cross-section taken along the line 7—7 on Figure 6.

Downward movement of the toaster carriage 14 also causes its projecting actuator element 86 to engage the upper inclined surface 84 on the relay setting lever, 81, swinging the latter to the right (as seen in Figures 2 and 5) and shifting the clapper 69 against the force of the spring 74 to a position in which the upper and lower contacts 72, 73 are engaged with the selector and heater element contacts 76, 75, respectively. As explained above, such action of the relay setting arm 69 allows the detent 78 on the latch lever 68 to engage the holding plate 79 and maintain the relay contacts 72, 73 in the position mentioned against the action of the clapper spring 74. The actuator finger 86 rides past the upper inclined surface 84 and takes a position below the setting lever 81, so as not to interfere with its swinging movement in a reverse direction.

At the start of the heating cycle, the timer bow 52 is relatively cool and occupies a position to the left with its contact 51 in engagement with the compensator contact 45. The depression of the carriage 14, having effected closing of the main switch and positioned the lower clapper contact 73 in engagement with the heating element contact 75, completes the circuit through the heating element 64, which begins heating the timer bow, causing it to be deflected to the right and moving its contact 51 gradually as the toasting period proceeds toward the fixed contact 43 on the selector arm 44. Upon moving the required distance to engage its contact 51 with the selector arm contact 43, the circuit to the solenoid coil 66 is completed, causing the solenoid plunger 67 to move outwardly and engage the latch lever 68, shifting it against its spring 70 to a position freeing its detent 78 from the latch plate 79 and allowing the clapper spring 74 to swing the clapper 69 on its pivot to the left (as viewed from Figures 1 and 2) disengaging the lower clapper contact 73 from the heating element contact 75 and the upper clapper contact 72 from the right selector contact 76, moving this latter contact into engagement with the left compensator contact 77, which is in series with the compensator contact 45 on the movable bracket 46. However, since at this time the timer bow contact 51 does not engage the compensator contact 45, the circuit through the solenoid is open, despite the fact that the upper clapper contact 72 engages the left, compensator relay contact 77.

Inasmuch as the circuit to the heating element 64 is open, it cools, allowing the bow strip 52 to cool and move its contact 51 away from the selector arm contact 43 and toward the compensator contact 45. During the time that this bow arm is moving in a return direction, the main switch contacts 39, 40 are still closed and the current to the toasting elements 16 continuously applied. Upon engagement of the timer bow contact 51 with the compensator contact 45, the circuit through the solenoid coil 66 is completed again and its plunger 67 is again propelled outwardly to swing the latch lever 68 on its clapper pivot.

It is to be noted that the first impulse imparted to the solenoid coil 66 has effected shifting of the latch lever 68 to a position in which its trip finger 80 has been projected through the plate 79 into alignment with the latch finger 32 projecting from the main tripping latch 27 pivotally carried by the carriage 14. Accordingly, the second current application to the solenoid coil 66 causes its movable plunger 67 to swing the latch lever finger 80 against the main latch finger 32, moving it inwardly and swinging its latch nose 34 outwardly free of the main switch arm roller 35, allowing the lifting spring 22 to elevate the carriage 14, toaster arms 13 and toast to its upper, initial, delivery position, and allowing the switch opening spring 37 to function to shift the main switch contact 39 downwardly out of contact with the stationary contacts 40.

The toasting cycle has thus been completed in an automatic manner, with the timer bow 52 at its initial position, and with its contact 51 in engagement with the automatically adjustable contact 45. The toaster carriage 14 and its arms 13 are in an upward position, the main switch being retained open by its spring 37. The cycle may be recommenced simply by grasping the handle 23 and lowering the carriage, which again causes the carriage actuator 86 to swing the setting lever 81 and reset the two-step relay contacts 72, 73 to the right against the action of the clapper spring 74, this position being maintained initially by engagement of the latch detent 78 against its holding plate 79. The lower inclined surface 85 on the setting lever 81 may also automatically set the relay for operation during the elevating movement of the toaster carriage 14 by engagement of the actuator arm 86 against this lower inclined surface, which will swing the setting lever 81 to the right and cause the latter to reset the relay mechanism.

The bimetallic strip 49 deflects in accordance with the temperature of the ambient air in the apparatus, causing shifting of the movable bracket 46 and its compensating contact 45 to and from the selector arm contact 43. For example, as the ambient air temperature increases, the compensator 49 shifts the bracket contact 45 toward the right, shortening the distance that the bow arm 52 must move during the cooling period, and correspondingly decreasing the time current is applied to the toaster elements.

The current application to the heating element 64 of the timer device determines the time required for the bow arm 52 to shift its movable contact 51 forward and into engagement with the selector arm contact 43. The lower the voltage applied to the heating element 64, the lower will be its heating rate and a longer period will elapse for the bow arm to move over into engagement with the selector arm contact. Conversely, the higher the voltage, the greater is the rate of heat application to the timer bow and the shorter will be the time required to move the contact 51 over into engagement with the selector arm contact 43.

The same voltage is applied to the heating element 64 as is applied to the toasting grids 16. Accordingly, a lower voltage in the apparatus calls for a longer toasting period of heat application, and this is automatically provided by the lesser rate of heat application imparted to the bow strip 52 by the current at a lower voltage passing through the heating element 64. Similarly, the higher the voltage the greater will be the current and heating rate in the main toasting elements 16, and the heating rate on the bow strip 52 will also be correspondingly higher causing the timer bow to shift its contact 51 in less time into engagement with the selector arm contact 43. The apparatus, therefore, automatically compensates for voltage variations.

Compensation is also provided for variations in the temperature of the ambient air during the cooling portion movement of the timer bow 52. The timer bow will have a shorter distance to return toward its initial starting position upon increase of the ambient air temperature than upon decrease in the ambient air temperature. Thus, the time of heat application to the main toasting elements 16 is controlled in dependence upon the temperature of the ambient air, and this control, coupled with the automatic control of the time of heat application in accordance with and in dependence upon the voltage through the apparatus, provides a close control of the amount of total heat applied to the bread or other product in the toaster, insuring uniform toasting of the product.

The manually selective arm 44 may be shifted by the operator to appropriately position the contact 43 which it carries, depending upon the toasting effect which the person desires upon the bread. The entire timing cycle may be adjusted at the assembly plant by suitably turning the adjusting screw 60 and swinging the movable bracket 58, in order to determine the initial tension of the timer bow 52.

It will be seen that a timing apparatus for toasters or similar cyclical apparatus has been provided, possessing comparatively fewer parts, which do not require manufacture to close tolerances in order to have accuracy in control of the timer cycle. The parts may be made by relatively simple equipment and assembled readily.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. Apparatus of the class described comprising a primary circuit having a primary switch, a control circuit for opening said primary switch comprising first and second auxiliary circuits, a pair of current supply lines, a solenoid having a plunger and a coil connected to one of the supply lines, a first double-throw switch connected to the other supply line and to the auxiliary circuits and movable to one position to connect the first auxiliary circuit to said other supply line and to another position to connect the second auxiliary circuit to said other supply line, a second double-throw switch connected to said coil and said auxiliary circuits and movable to one position to connect said first auxiliary circuit to the coil and another position to connect said second auxiliary circuit to the coil, thermal-responsive means operable when cold to position said first switch so that the first auxiliary circuit is connected to said other supply line and operable when heated to move the first switch to a position where the second auxiliary circuit is connected to said other supply line, a heater for the thermal-responsive means connected in the control circuit and energized when the second switch is in said another position whereby the thermal-responsive means is heated, means biasing the second switch toward its position wherein the first auxiliary circuit is connected to the coil, means for latching the second switch in its position to connect the second auxiliary circuit to the coil, means operable by the solenoid for releasing the second switch to allow said second switch to move to connect the first auxiliary circuit to the coil, a primary switch-actuating member operable by the plunger to open the primary switch, means for latching the primary switch-actuating member in a position incapable of opening the primary switch operable by operation of the solenoid for releasing the primary switch-actuating member, and means for urging the primary switch-actuating member into its operative position, whereby when a control cycle begins the coil of the solenoid is in de-energized condition because neither auxiliary circuit is connected to both said another supply line and said solenoid coil, however, the heater operates to cause the thermal-responsive means to move to its hot position whereby the solenoid is energized to unlatch the second switch and to de-energize the heater and solenoid coil and to unlatch the primary switch-actuating member, whereby the primary switch-actuating member is moved to its operative position and when the thermal-responsive means on cooling moves to its cold position, the solenoid is once again energized to cause the primary switch-actuating member to open the primary switch.

2. Apparatus of the class described comprising a primary circuit having a primary switch, a control circuit for opening said primary switch comprising first and second auxiliary circuits, a pair of current supply lines, a solenoid having a plunger and a coil connected to one of the supply lines, a first double-throw switch connected to the other supply line and to the auxiliary circuits and movable to one position to connect the first auxiliary circuit to said other supply line and to another position to connect the second auxiliary circuit to said other supply line, a second double-throw switch connected to said coil and said auxiliary circuits and movable to one position to connect said first auxiliary circuit to the coil and another position to connect said second auxiliary circuit to the coil, thermal-responsive means operable when cold to position said first switch so that the first auxiliary circuit is connected to said other supply line and operable when heated to move the first switch to a position where the second auxiliary circuit is connected to said other supply line, a heater for the thermal-responsive means connected in the control circuit and energized when the second switch is in said another position whereby the thermal-responsive means is heated, means biasing the second switch toward its position wherein the first auxiliary circuit is connected to the coil, means for latching the second switch in its position to connect the second auxiliary circuit to the coil, means operable by the solenoid for releasing the second switch to allow said second switch to move to connect the first auxiliary circuit to the coil, a primary switch-actuating member operable by the plunger to open the primary switch, means for latching the primary switch-actuating member in a position incapable of opening the primary switch operable by operation of the solenoid for releasing the primary switch-actuating member, and means for urging the primary switch-actuating member into its operative position, whereby when a control cycle begins, the coil of the solenoid is in de-energized condition because neither auxiliary circuit is connected to both said another supply line and said solenoid coil, however, the heater operates to cause the thermal-responsive means to move to its hot position whereby the solenoid is energized to unlatch the second switch and to de-energize the heater and solenoid coil and to unlatch the primary switch-actuating member, whereby the primary switch-actuating member is moved to its operative position and when the thermal-responsive means on cooling moves to its cold position, the solenoid is once again energized to cause the primary switch-actuating member to open the primary switch, said primary switch being in one of the supply lines whereby when the primary switch is open the control circuit is de-energized, and means for closing the primary switch operable to latch said second switch in said another position.

3. Apparatus of the class described comprising a primary circuit having a primary switch, a control circuit for opening said primary switch comprising first and second auxiliary circuits, a pair of current supply lines, a solenoid having a plunger and a coil connected to one of the supply lines, a first double-throw switch connected to the other supply line and to the auxiliary circuits and movable to one position to connect the first auxiliary circuit to said other supply line and to another position to connect the second auxiliary circuit to said other supply line, a second double-throw switch connected to said coil and said auxiliary circuits and movable to one position to connect said first auxiliary circuit to the coil and another position to connect said second auxiliary circuit to the coil, thermal-responsive means operable when cold to position said first switch so that the first auxiliary circuit is connected to said other supply line and operable when heated to move the first switch to a position where the second auxiliary circuit is connected to said other supply line, a heater for the thermal-responsive means connected in the control circuit and energized when the second switch is in said another position whereby the thermal-responsive means is heated, means biasing the second switch toward its position wherein the first auxiliary circuit is connected to the coil, means for latching the second switch in its position to connect the second auxiliary circuit to the coil, means operable by the solenoid for releasing the second switch to allow said second switch to move to connect the first auxiliary circuit to the coil, a primary switch-actuating member operable by the plunger to open the primary switch, means for latching the primary switch-actuating member in a position incapable of opening the primary switch operable by operation of the solenoid for releasing the primary switch-actuating member, and means for urging the primary switch-actuating member into its operative position, whereby when a control cycle begins the coil of the solenoid is in de-energized condition because neither auxiliary circuit is connected to both said another supply line and said solenoid coil, however, the heater operates to cause the thermal-responsive means to move to its hot position whereby the solenoid is energized to unlatch the second switch and to de-energize the heater and solenoid coil and to unlatch the primary switch-actuating member, whereby the primary switch-actuating member is moved to its operative position and when the thermal-responsive means on cooling moves to its cold position, the solenoid is once again energized to cause the primary switch-actuating member to open the primary switch, and means for closing the primary switch operable to latch said second switch in said another position and latch said primary switch-actuating member in its inoperative position.

4. Apparatus of the class described comprising a primary circuit having a primary switch, a control circuit for opening said primary switch comprising first and second auxiliary circuits, a pair of current supply lines, a solenoid having a plunger and a coil connected to one of the supply lines, a first double-throw switch connected to the other supply line and to the auxiliary circuits and movable to one position to connect the first auxiliary circuit to said other supply line and to another position to connect the second auxiliary circuit to said other supply line, a second double-throw switch connected to said coil and said auxiliary circuits and movable to one position to connect said first auxiliary circuit to the coil and another position to connect said second auxiliary circuit to the coil, thermal-responsive means operable when cold to position said first switch so that the first auxiliary circuit is connected to said other supply line and operable when heated to move the first switch to a position where the second auxiliary circuit is connected to said other supply line, heating means for the thermal-responsive means connected in the control circuit and energized when the second switch is in said another position whereby the heating means causes heating of the thermal-responsive means, means biasing the second switch toward its position wherein the first auxiliary circuit is connected to the coil, means for latching the second switch in its position to connect the second auxiliary circuit to the coil, means operable by the solenoid for releasing the second switch to allow the second switch to move to connect the first auxiliary circuit to the coil, means operable on the second actuation in a control cycle of the solenoid for opening the primary switch, whereby, when a control cycle begins, the solenoid coil is in de-energized condition because neither auxiliary circuit is connected to both said another supply line and said coil, however, the heating means operates to cause the thermal-responsive means to move to its hot position whereby the solenoid is actuated a first time to unlatch the second switch and to de-energize the heating means and solenoid coil, whereby, when the thermal-responsive means on cooling moves to its cold position, the solenoid is actuated a second time to cause opening of the primary switch.

5. Apparatus of the class described comprising a primary circuit having a primary switch, a control circuit for opening said primary switch comprising first and second auxiliary circuits, a pair of current supply lines, a solenoid having a plunger and a coil connected to one of the supply lines, a first double-throw switch connected to the other supply line and to the auxiliary circuits and movable to one position to connect the first auxiliary circuit to said other supply line and to another position to connect the second auxiliary circuit to said other supply line, a second double-throw switch connected to said coil and said auxiliary circuits and movable to one position to connect said first auxiliary circuit to the coil and another position to connect said second auxiliary circuit to the coil, thermal-responsive means operable when cold to position said first switch so that the first auxiliary circuit is connected to said other supply line and operable when heated to move the first switch to a position where the second auxiliary circuit is connected to said other supply line, heating means for the thermal-responsive means connected in the control circuit and energized when the second switch is in said another position to supply heat for heating the thermal-responsive means, means biasing the second switch toward its position wherein the first auxiliary circuit is connected to the coil, means for latching the second switch in its position to connect the second auxiliary circuit to the coil, means operable by the solenoid for releasing the second switch to allow the second switch to move to connect the first auxiliary circuit to the coil, means operable on the second actuation in a control cycle of the solenoid for opening the primary switch, and means for closing the primary switch operable to latch said second switch in said another position, whereby, when a control cycle begins, the solenoid coil is in de-energized condition because neither auxiliary circuit is connected to both said another supply line and said coil, however, the heating means operates to cause the thermal-responsive means to move to its hot position whereby the solenoid is actuated a first time to unlatch the second switch and to de-energize the heating means and solenoid coil, whereby, when the thermal-responsive means on cooling, moves to its cold position, the solenoid is actuated a second time to cause opening of the primary switch.

6. Apparatus of the class described comprising a primary circuit having a primary switch, a control circuit for opening said primary switch comprising first and second auxiliary circuits, a pair of current supply lines, a solenoid having a plunger and a coil connected to one of the supply lines, a first double-throw switch connected to the other supply line and to the auxiliary circuits and movable to one position to connect the first auxiliary circuit to said other supply line and to another position to connect the second auxiliary circuit to said other supply line, a second double-throw switch connected to said coil and said auxiliary circuits and movable to one position to connect said first auxiliary circuit to the coil and another position to connect said second auxiliary circuit to the coil, thermal-responsive means operable when cold to position said first switch so that the first auxiliary circuit is connected to said other supply line and operable when heated to move the first switch to a position where the second auxiliary circuit is connected to said other supply line, heating means connected to said other supply line, a single-throw, single-pole switch connecting the heating means to said one supply line and operable in unison with said second switch, means biasing the second switch toward its position wherein the first auxiliary circuit is connected to the coil, means for latching the second switch in its position to connect the second auxiliary circuit to the coil, means operable by the solenoid for releasing the second switch to allow the second switch to move to connect the first auxiliary circuit to the coil, a primary switch-actuating member operable by the plunger to open the primary switch, means for latching the primary switch-actuating member in a position incapable of opening the primary switch operable by operation of the solenoid for releasing the primary switch-actuating member, and means for urging the primary switch-actuating member into operative position, whereby, when a control cycle begins, the coil of the solenoid is in de-energized condition, because neither auxiliary circuit is connected to both said another supply line and said solenoid coil, however, the heater operates to cause the thermal-responsive means to move to its hot position where the solenoid is energized to unlatch the second switch and to de-energize the heater and solenoid coil and to unlatch the primary switch-actuating member, whereby, the primary switch-actuating member is moved to its operative position, and when the thermal-responsive means, on cooling, moves to its cold position, the solenoid is once again actuated to cause the primary switch-actuating member to open the primary switch.

7. Apparatus of the class described comprising a primary circuit having a primary switch, a control circuit for opening said primary switch comprising first and second auxiliary circuits, a pair of current supply lines, a solenoid having a plunger and a coil connected to one of the supply lines, a first double-throw switch connected to the other supply line and to the auxiliary circuits and movable to one position to connect the first auxiliary circuit to said other supply line and to another position to connect the second auxiliary circuit to said other supply line, a second double-throw switch connected to said coil and said auxiliary circuits and movable to one position to connect said first auxiliary circuit to the coil and another position to connect said second auxiliary circuit to the coil, thermal-responsive means operable when cold to position said first switch so that the first auxiliary circuit is connected to said other supply line and operable when heated to move the first switch to a position where the second auxiliary circuit is connected to said other supply line, heating means for the thermal-responsive means connected in the control circuit and energized when the second switch is in said another position whereby heat is supplied to the thermal-responsive means, means positioning said second switch in said another position operable by the first actuation in a control cycle of solenoid to cause said second switch to move to said one position, means operable by the second actuation in a control cycle of the solenoid for opening the primary switch, whereby, when a control cycle begins, the solenoid coil is in de-energized position because neither of the auxiliary circuits is connected to both said other supply line and said coil, however, the heating means operates to cause the thermal-responsive means to move to its hot position whereby the solenoid is actuated a first time resulting in said second switch being moved to said one position, and said solenoid coil and heater being de-energized, whereby, the thermal-responsive means, moves to its cold position to cause a second actuation of the solenoid to cause opening of the primary switch.

8. Apparatus of the class described comprising a primary circuit having a primary switch, a control circuit for opening said primary switch comprising first and second auxiliary circuits, a pair of current supply lines, a solenoid having a plunger and a coil connected to one of the supply lines, a first double-throw switch connected to the other supply line and to the auxiliary circuits and movable to one position to connect the first auxiliary circuit to said other supply line and to another position to connect the second auxiliary circuit to said other supply line, a second double-throw switch connected to said coil and said auxiliary circuits and movable to one position to connect said first auxiliary circuit to the coil and another position to connect said second auxiliary circuit to the coil, thermal-responsive means operable when cold to position said first switch so that the first auxiliary circuit is connected to said other supply line and operable when heated to move the first switch to a position where the second auxiliary circuit is connected to said other supply line, heating means for the thermal-responsive means connected in the control circuit and energized when the second switch is in said another position whereby heat is supplied to the thermal-responsive means, means positioning said second switch in said another position operable by the first actuation in a control cycle of the solenoid to cause said second switch to move to said one position, a primary switch-actuating member operable by the solenoid to open the primary switch, means for latching the primary switch-actuating member in a position incapable of opening the primary switch operable by operation of the solenoid for releasing the primary switch-actuating member, and means for urging the primary switch-actuating member into operative position, whereby, when a control cycle begins, the solenoid coil is in de-energized condition because neither of the auxiliary circuits is connected to both said other supply lines and said coil, however, the heating means operates to cause the thermal-responsive means to move to its hot position whereby the solenoid is actuated a first time to de-energize the solenoid coil and allow the second switch to be moved to said one position and to unlatch the primary switch-actuating member whereby the primary switch-actuating member is moved to its operative position, and when the thermal-responsive means on cooling moves to its cold position, the solenoid is actuated a second time to cause opening of the primary switch.

9. Apparatus of the class described comprising a primary circuit having a primary switch, a control circuit for opening said primary switch comprising first and second auxiliary circuits, a pair of current supply lines, a solenoid having a plunger and a coil connected to one of the supply lines, a first double-throw switch connected to the other supply line and to the auxiliary circuits and movable to one position to connect the first auxiliary circuit to said other supply line and to another position to connect the second auxiliary circuit to said other supply line, a second double-throw switch connected to said coil and said auxiliary circuits and movable to one position to connect said first auxiliary circuit to the coil and another position to connect said second auxiliary circuit to the coil, thermal-responsive means operable when cold to position said first switch so that the first auxiliary circuit is connected to said other supply line and operable when heated to move the first switch to a position where the second auxiliary circuit is connected to said other supply line, heating means for the thermal-responsive means connected in the control circuit and energized when the second switch is in said another position whereby heat is supplied to the thermal-responsive means, means positioning said second switch in said another position operable by the first actuation in a control cycle of the solenoid to cause said second switch to move to said one position, a primary switch-actuating member operable by the solenoid to open the primary switch, means for latching the primary switch-actuating member in a position incapable of opening the primary switch operable by operation of the solenoid for releasing the primary switch-actuating member, and means for urging the primary switch-actuating member into operative position, whereby, when a control cycle begins, the solenoid coil is in de-energized condition because neither of the auxiliary circuits is connected to both said other supply lines and said coil, however, the heating means operates to cause the thermal-responsive means to move to its hot position whereby the solenoid is actuated a first time to de-energize the solenoid coil and allow the second switch to be moved to said one position and to unlatch the primary switch-actuating member whereby the primary switch-actuating member is moved to its operative position, and when the thermal-responsive means on cooling moves to its cold position, the solenoid is actuated a second time to cause opening of the primary switch, means for closing the primary switch operable to latch the primary switch-actuating member in its latched position.

FRED H. COLE.

REFERENCES CITED

The following references are of record in the file of this patent:

UNITED STATES PATENTS

| Number | Name | Date |
|---|---|---|
| 2,180,233 | Graham | Nov. 14, 1939 |
| 2,196,380 | Biebel | Apr. 9, 1940 |
| 2,302,117 | Gomersall | Nov. 17, 1942 |
| 2,494,863 | Dietz | Jan. 17, 1950 |